United States Patent
Place et al.

(10) Patent No.: US 9,089,899 B2
(45) Date of Patent: Jul. 28, 2015

(54) PIPE FLANGE FACING APPARATUS AND METHOD

(75) Inventors: Brent K. Place, Hager City, WI (US); Pieter W. Ernest, Son en Breugel (NL)

(73) Assignee: Actuant Corporation, Menomonee Falls, WI (US)

( * ) Notice: Subject to any disclaimer, the term of this patent is extended or adjusted under 35 U.S.C. 154(b) by 1626 days.

(21) Appl. No.: 12/579,006

(22) Filed: Oct. 14, 2009

(65) Prior Publication Data

US 2011/0083537 A1   Apr. 14, 2011

(51) Int. Cl.
   *B23B 5/16*    (2006.01)
   *B23B 3/22*    (2006.01)
   *B23B 3/26*    (2006.01)

(52) U.S. Cl.
   CPC .................. *B23B 3/265* (2013.01); *B23B 5/162* (2013.01); *Y10T 82/10* (2015.01); *Y10T 82/22* (2015.01); *Y10T 82/2522* (2015.01)

(58) Field of Classification Search
   CPC ............ B23B 3/22; B23B 5/16; B23B 3/265; B23B 5/162; Y10T 82/10
   USPC ........ 82/113, 123, 128, 131; 408/79; 409/179
   IPC .......................................................... B23B 3/22
   See application file for complete search history.

(56) References Cited

U.S. PATENT DOCUMENTS

| | | | | |
|---|---|---|---|---|
| 1,904,950 A | * | 4/1933 | Neckerman | 82/173 |
| 2,436,152 A | * | 2/1948 | Richards | 82/128 |
| 2,842,238 A | * | 7/1958 | Shaw et al. | 409/179 |
| 3,772,944 A | * | 11/1973 | Becker et al. | 82/113 |
| 3,807,047 A | * | 4/1974 | Sherer et al. | 30/97 |
| 3,908,491 A | * | 9/1975 | Gilmore | 82/113 |
| 3,927,584 A | * | 12/1975 | Mayfield | 82/113 |
| 4,033,208 A | | 7/1977 | Gilmore | |
| 4,114,484 A | * | 9/1978 | Feamster, III | 82/113 |
| 4,365,528 A | * | 12/1982 | Astle | 82/113 |
| 4,677,884 A | * | 7/1987 | Kwech et al. | 82/113 |
| 4,784,028 A | * | 11/1988 | Sandford | 82/128 |
| 4,852,435 A | | 8/1989 | Hunt | |
| 4,981,055 A | | 1/1991 | VanderPol et al. | |
| D326,101 S | | 5/1992 | Tsay | |
| D329,436 S | | 9/1992 | Saito | |
| D330,379 S | | 10/1992 | Hoover | |
| 5,642,969 A | | 7/1997 | Strait | |

(Continued)

OTHER PUBLICATIONS

Hydratight, pages from www.hydratight.com, Technical Data on the GTB2 and 314 Beveler, admitted prior art, Oct. 13, 2008.

*Primary Examiner* — Sunil K Singh
*Assistant Examiner* — Sara Addisu
(74) *Attorney, Agent, or Firm* — Michael Best & Friedrich LLP

(57) ABSTRACT

An apparatus for facing a flange of a pipe includes a housing and an anchor assembly rotatably supported by the housing. The anchor assembly is configured to engage an inner surface of the pipe. The apparatus further includes a tool holder translatably supported by the housing. The tool holder is configured to support a facing tool for facing the flange of the pipe. The apparatus further includes a drive shaft that is rotatable relative to the housing to translate the tool holder relative to the housing. The housing is rotatable relative to the anchor assembly about a first axis in a first direction and the drive shaft is simultaneously rotatable relative to the housing about a second axis in a second direction opposite the first direction to move the tool holder along a spiral path and thereby face the flange of the pipe.

18 Claims, 13 Drawing Sheets

(56) References Cited

U.S. PATENT DOCUMENTS

| | | |
|---|---|---|
| 5,775,188 A | 7/1998 | Strait |
| 6,050,161 A * | 4/2000 | Tremblay .................. 82/113 |
| 6,189,425 B1 * | 2/2001 | Ricci et al. ................ 82/113 |
| 6,994,002 B2 * | 2/2006 | Moruzzi .................... 82/123 |
| 7,143,673 B2 * | 12/2006 | Hall ........................... 82/113 |
| 7,172,374 B2 | 2/2007 | Burr et al. |
| 7,252,025 B2 * | 8/2007 | Place et al. ................ 82/113 |
| 7,383,758 B2 * | 6/2008 | Place et al. ................ 82/113 |
| 2001/0029817 A1 | 10/2001 | Strait |
| 2003/0000353 A1 | 1/2003 | Richards et al. |
| 2013/0239762 A1 * | 9/2013 | Place .......................... 82/113 |

* cited by examiner

PIPE FLANGE FACING APPARATUS AND METHOD

CROSS-REFERENCE TO RELATED APPLICATION

Not applicable.

STATEMENT OF FEDERALLY SPONSORED RESEARCH OR DEVELOPMENT

Not applicable.

BACKGROUND OF THE INVENTION

This invention relates to a pipe flange facing apparatus, particularly a manual pipe flange facing apparatus.

Many industrial facilities, such as chemical plants, pulp mills, shipyards, oil refineries and the like include pipes that carry various fluids. Pipes in these environments are often constructed in multiple sections. The end of each pipe section includes a flange to connect to that of another pipe section, typically by fasteners or the like. The flange interfaces require maintenance as they deteriorate over time and can be damaged. As such, re-facing operations are typically conducted to repair deteriorated or damaged pipe flanges.

Previous pipe flange facing devices have been designed such that flanges may be repaired on-site (i.e., without having to transport pipes to a repair facility) after simply disconnecting and separating the pipe flanges. These devices typically include a frame that supports a tool for cutting or re-facing the pipe flanges. Furthermore, a power source, such as a portable generator or an air compressor is provided to drive the re-facing tool during the operation.

Unfortunately, previous pipe flange facing devices are relatively large and heavy to accommodate the high operating loads provided by the power source. Such structures prevent the use of previous pipe flange facing devices in "hard to reach" locations or other locations having a limited amount of space. In addition, some of the power sources, such as air compressors, prevent the use of previous pipe flange facing devices on remote sites without electricity.

Considering the limitations of previous pipe flange facing devices, a need exists for an improved apparatus that reduces or eliminates one or more of the aforementioned drawbacks.

SUMMARY OF THE INVENTION

In one aspect, the present invention provides an apparatus for facing a flange of a pipe. The apparatus comprises a housing and an anchor assembly rotatably supported by the housing. The anchor assembly is configured to engage an inner surface of the pipe. The apparatus further comprises a tool holder translatably supported by the housing. The tool holder is configured to support a facing tool for facing the flange of the pipe. The apparatus further comprises a drive shaft that is rotatable relative to the housing to translate the tool holder relative to the housing. The housing is rotatable relative to the anchor assembly about a first axis in a first direction and the drive shaft is simultaneously rotatable relative to the housing about a second axis in a second direction opposite the first direction to move the tool holder along a spiral path and thereby face the flange of the pipe.

In another aspect, the pipe flange facing apparatus comprises a housing and a tool holder supported by the housing. The tool holder is configured to support a facing tool for facing the flange of the pipe. The apparatus further comprises a plurality of centering locators and a centering shaft supported by the housing. The centering shaft is translatable in an axial direction relative to the housing. The apparatus further comprises a centering handle connected to the centering shaft. The centering handle is rotatable relative to the centering shaft to translate the centering shaft in the axial direction and thereby displace the centering locators in a radial direction to engage the internal surface of the pipe.

In yet another aspect, the present invention provides a method of facing a flange of a pipe using a flange facing apparatus. The apparatus includes a housing that supports an anchor assembly, a facing tool, and a drive handle. The method comprises the steps of: securing the anchor assembly relative to the pipe; and applying a drive force to the drive handle to thereby: (a) rotate the drive handle relative to the housing to thereby drive the facing tool along a linear path relative to the housing; and (b) rotate the housing relative to the pipe to thereby cause, together with the facing tool being driven along the linear path relative to the housing, the facing tool to trace a spiral path relative to the pipe.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
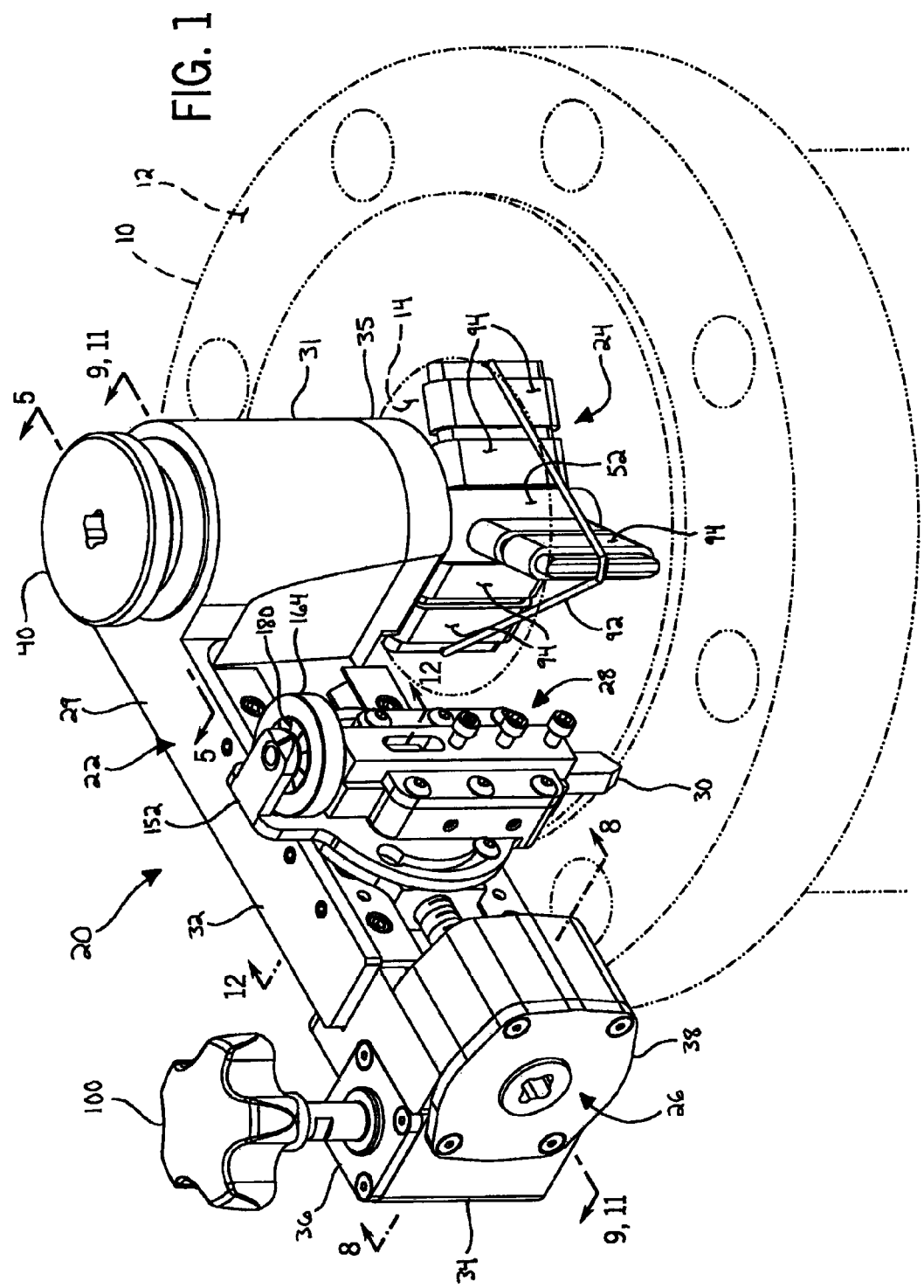
FIG. 1 is a front perspective view of a pipe flange facing apparatus of the present invention.
Figure 2:
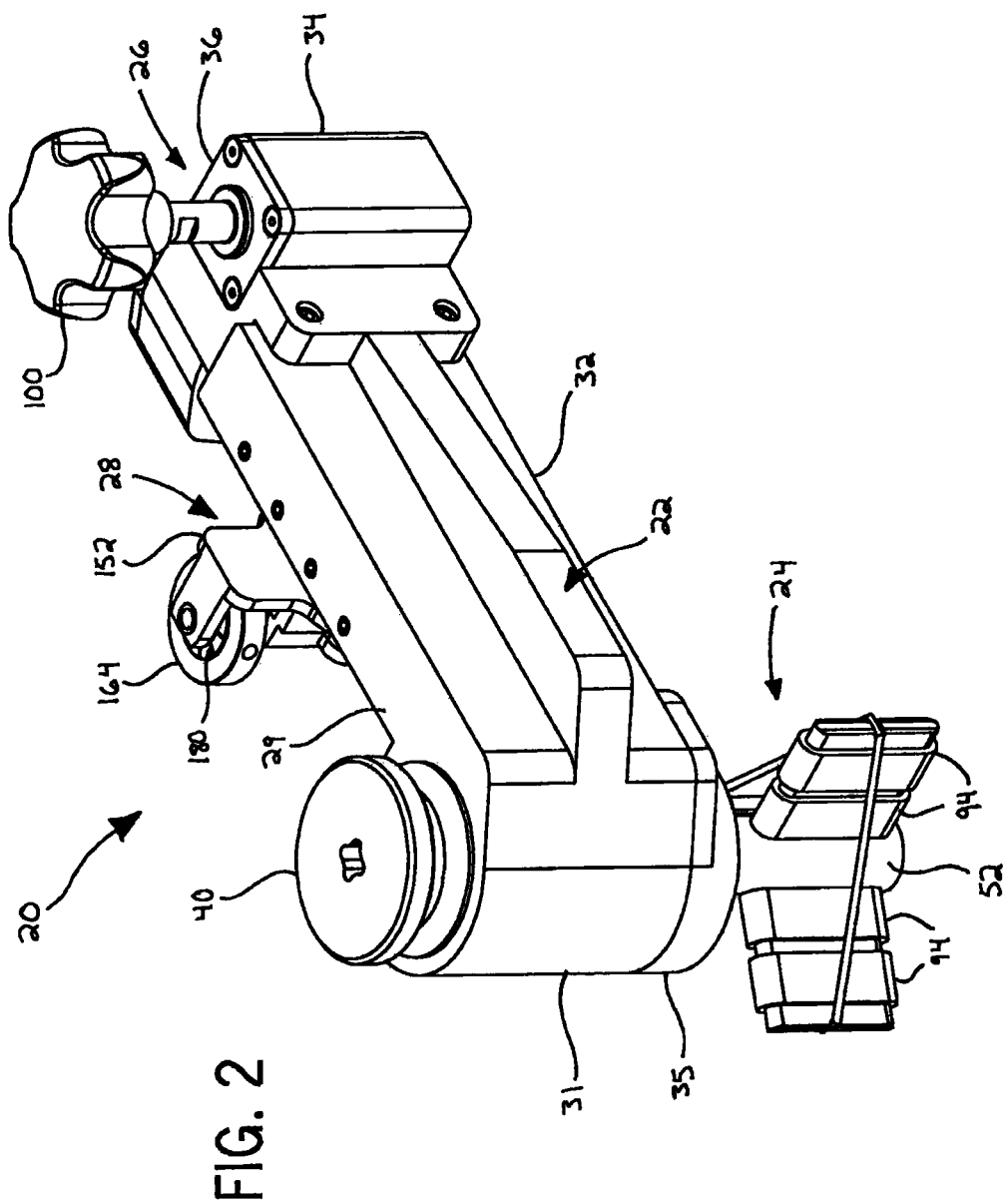
FIG. 2 is a rear perspective view of the pipe flange facing apparatus of FIG. 1.
Figure 3:
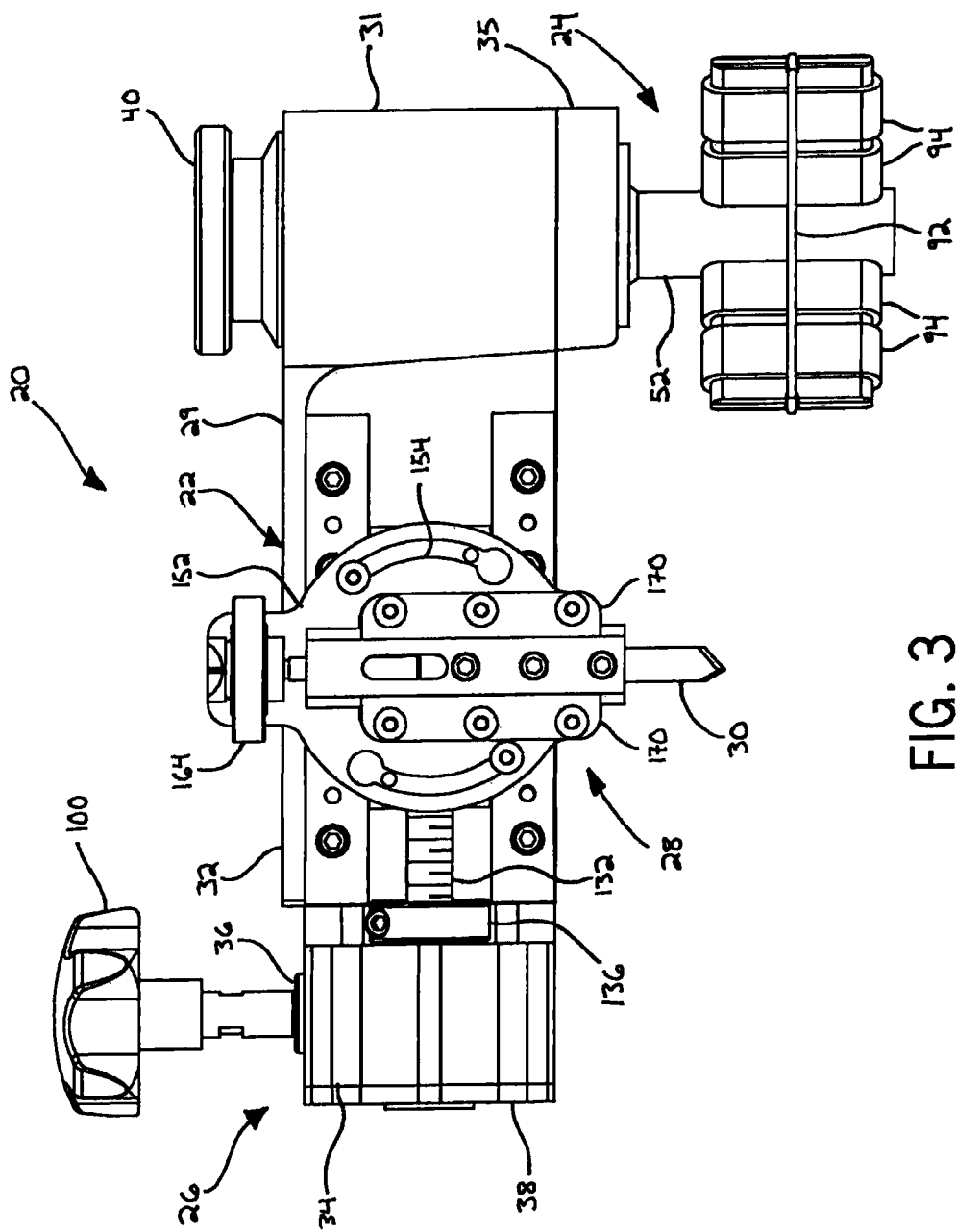
FIG. 3 is a front view of the pipe flange facing apparatus of FIG. 1.

Referring to now to the drawings and particularly FIGS. 1-4, a pipe flange facing apparatus 20 of the present invention includes a housing 22 that rotatably supports an anchor assembly 24 for securing the apparatus 20 relative to a pipe 10. The pipe flange facing apparatus 20 also includes a feed assembly 26 that drives a tool support assembly 28. The tool support assembly 28 supports a flange facing tool 30 that re-faces (or simply "faces") a flange 12 of the pipe 10 as the housing 22 rotates about the anchor assembly 24. These components are described in further detail in the following paragraphs, beginning with the housing 22 and proceeding to the tool support assembly 28. A preferred method of using the pipe flange facing apparatus 20 is also described.

Still referring to FIGS. 1-4, the housing 22 includes an anchor-tool support bracket 29 having an anchor support 31 that defines an internal support shaft passageway 33. The anchor support 31 connects to a housing cap 35 that secures several components of the anchor assembly 24 within the support shaft passageway 33 as described in further detail below. The anchor-tool support bracket 29 also includes a gib support 32 extending from the anchor support 31. The gib support 32 mounts a gearbox 34 opposite the anchor support 31. The gearbox 34 houses several components of the feed assembly 26, and a first gearbox cover 36 and a second gearbox cover 38 secure several components of the feed assembly 26 within the gearbox 34 as described in further detail below.

Figure 4:
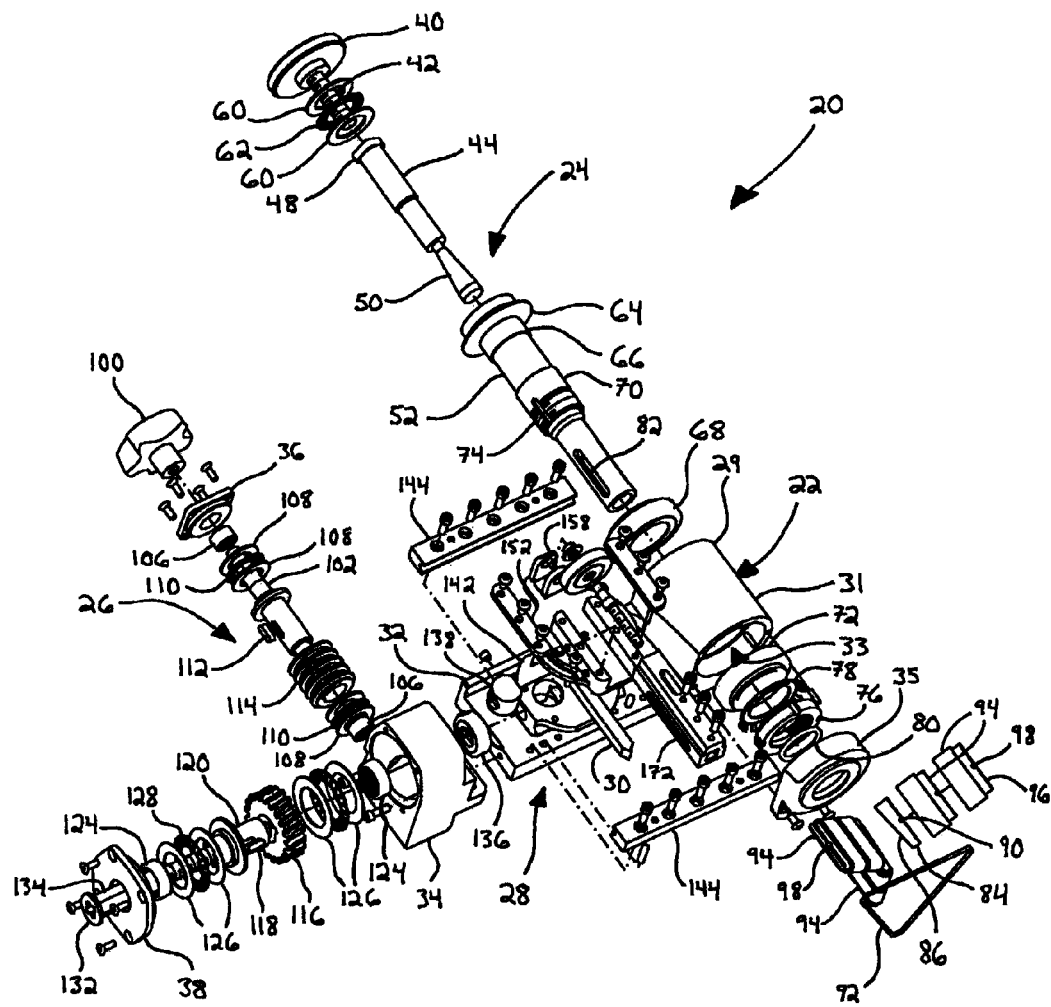
FIG. 4 is a exploded perspective view of the pipe flange facing apparatus of FIG. 1.
Figure 5:
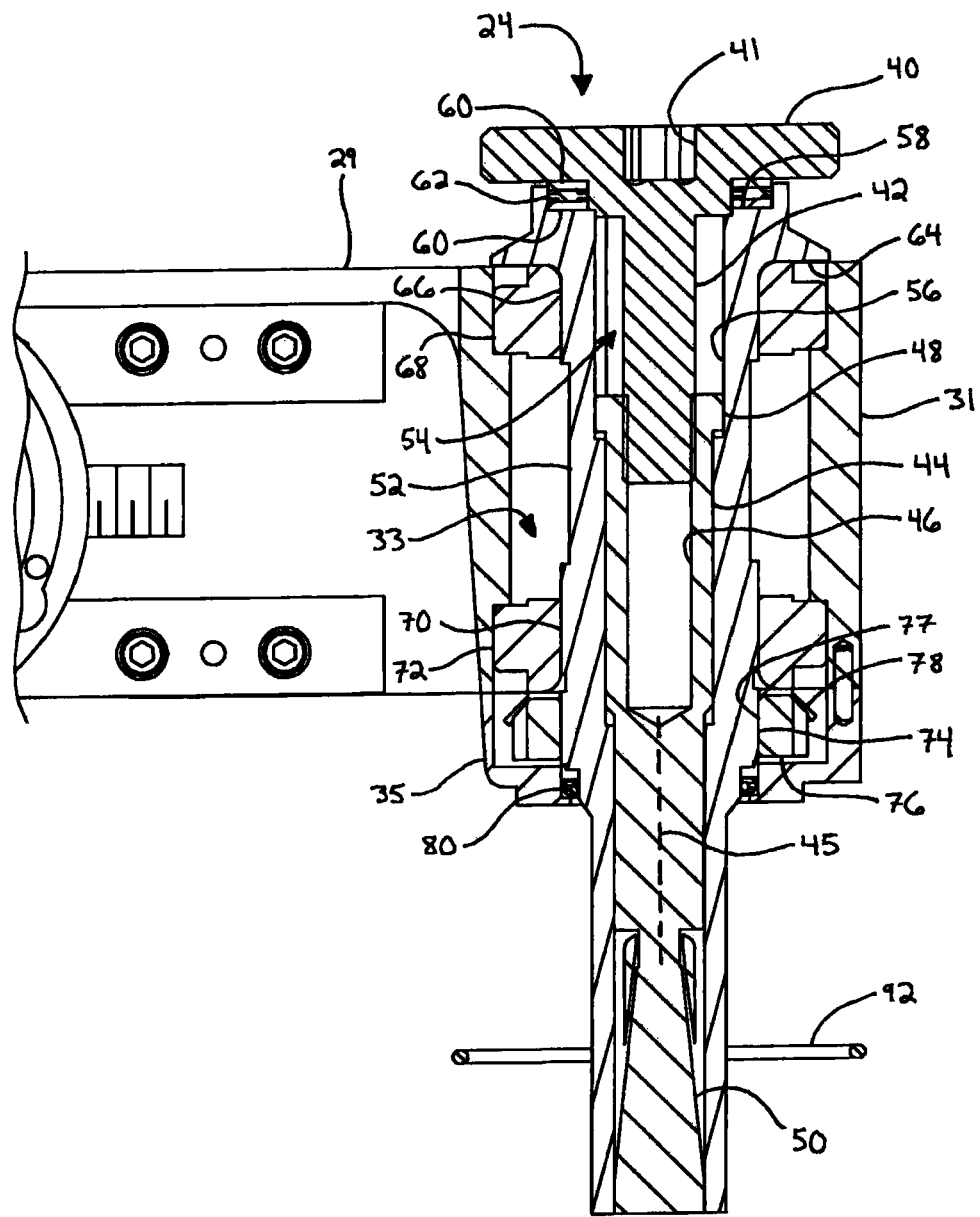
FIG. 5 is a sectional view along line 5-5 of FIG. 1 illustrating an anchor assembly of the pipe flange facing apparatus.
Figure 6:
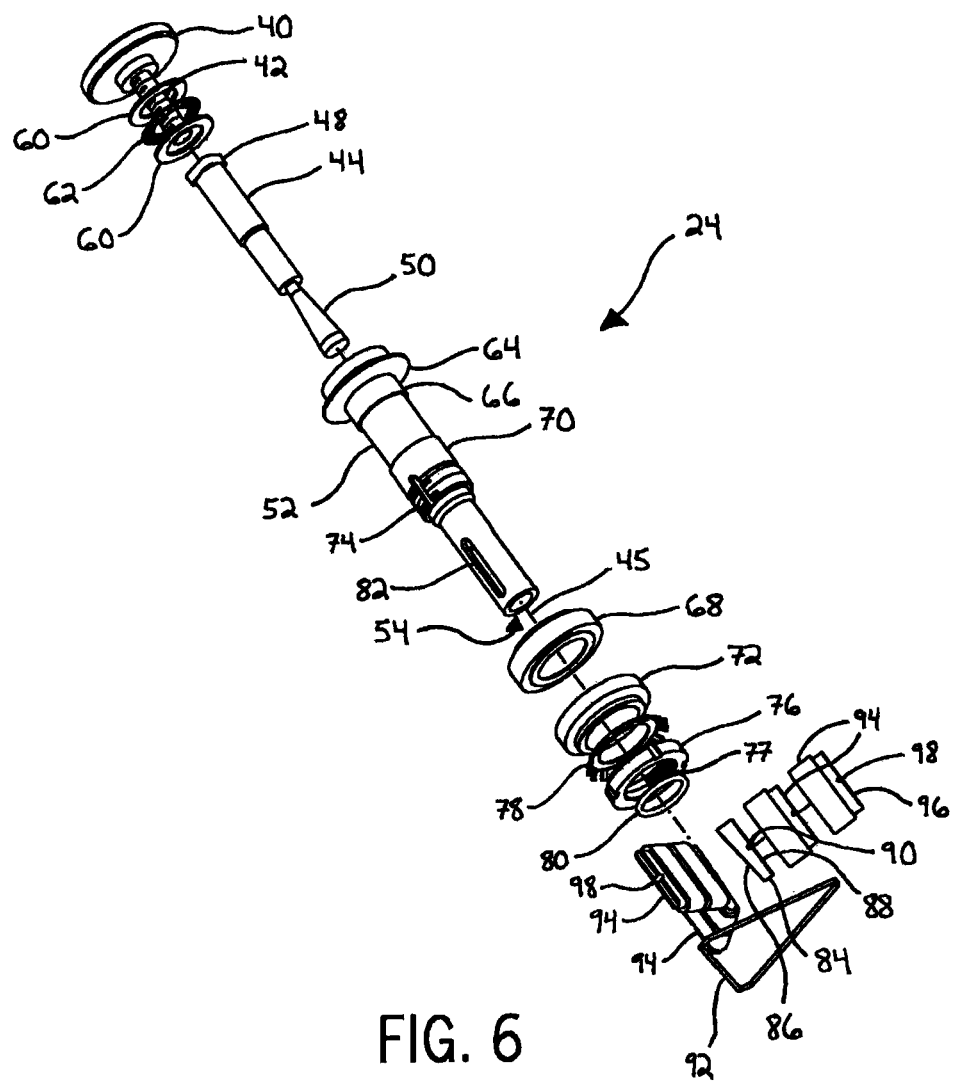
FIG. 6 is an exploded perspective view of the anchor assembly of the pipe flange facing apparatus.
Figure 7:
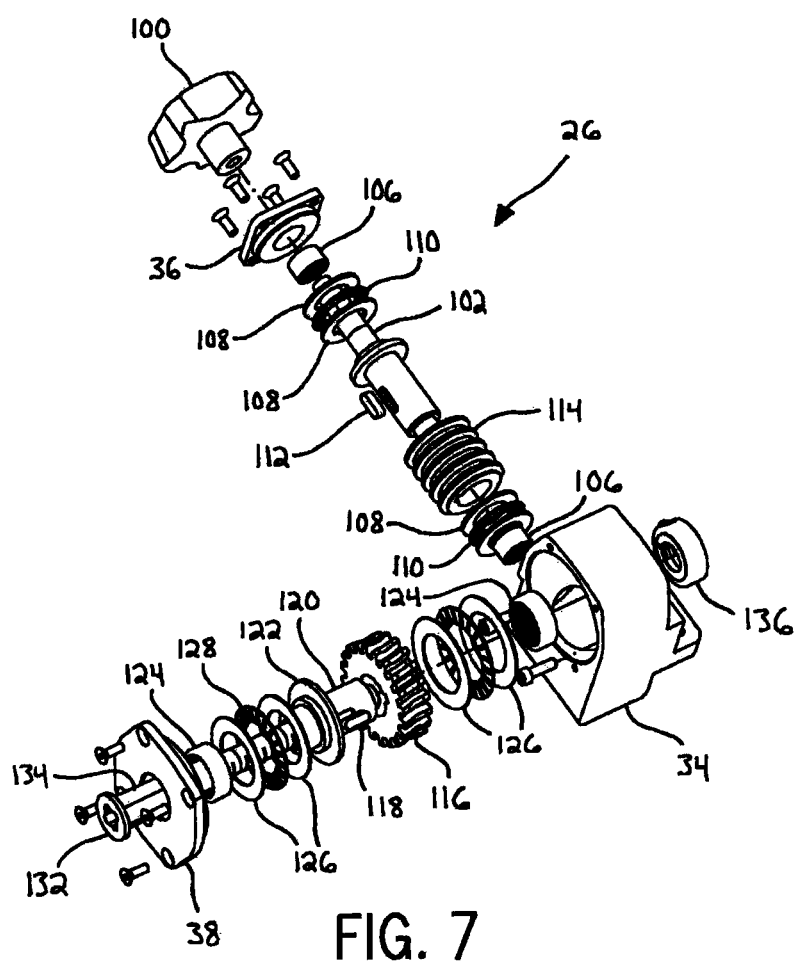
FIG. 7 is an exploded perspective view of a feed assembly of the pipe flange facing apparatus.
Figure 8:
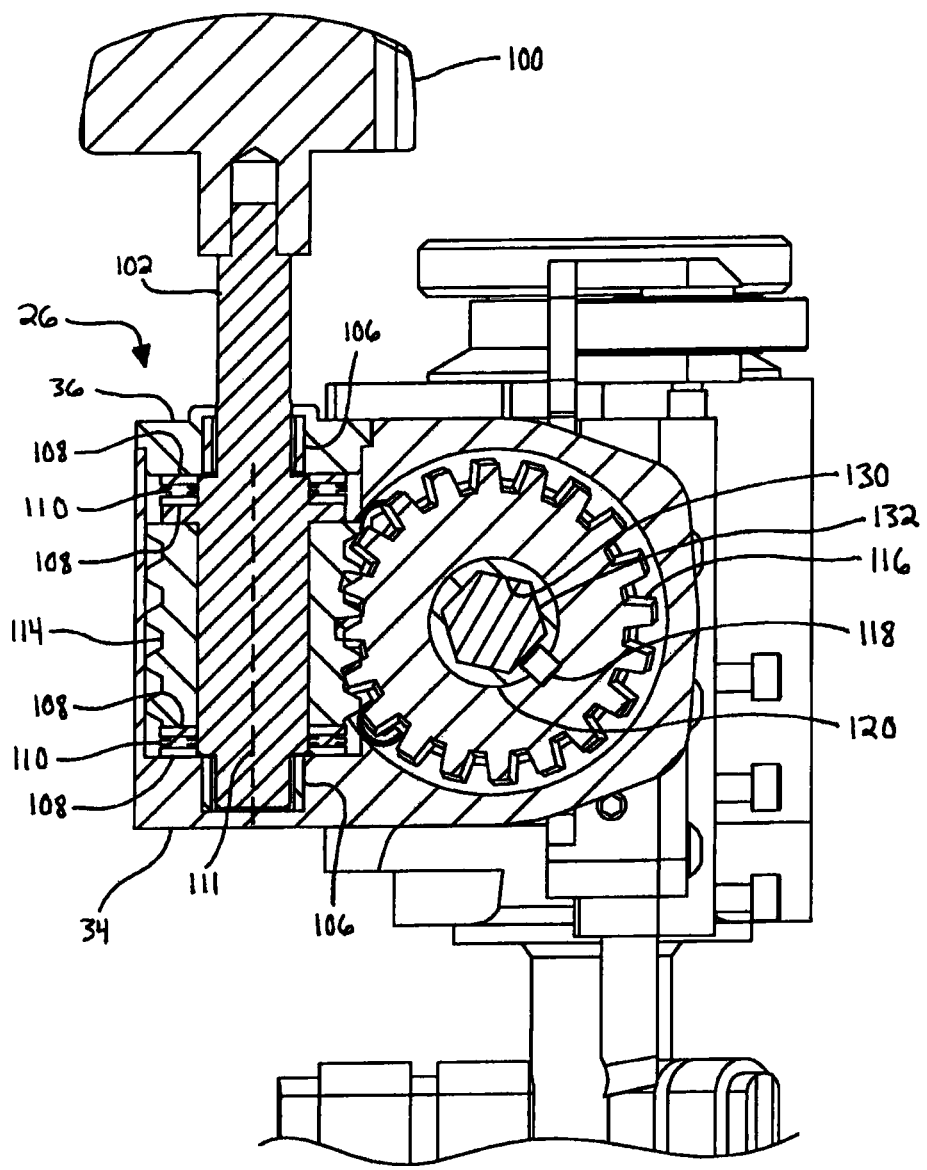
FIG. 8 is a sectional view along line 8-8 of FIG. 1 illustrating a worm and a worm gear of the feed assembly.
Figure 9:
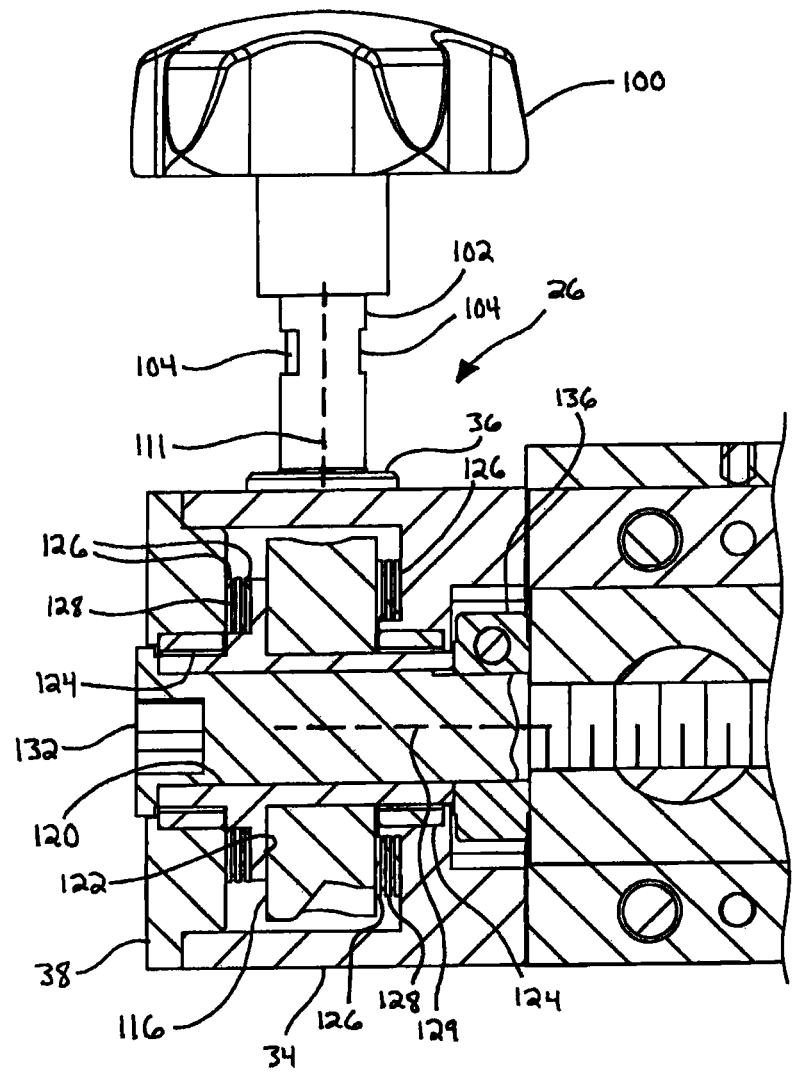
FIG. 9 is a sectional view along line 9-9 of FIG. 1 illustrating the worm gear and a feed screw of the feed assembly.
Figure 10:
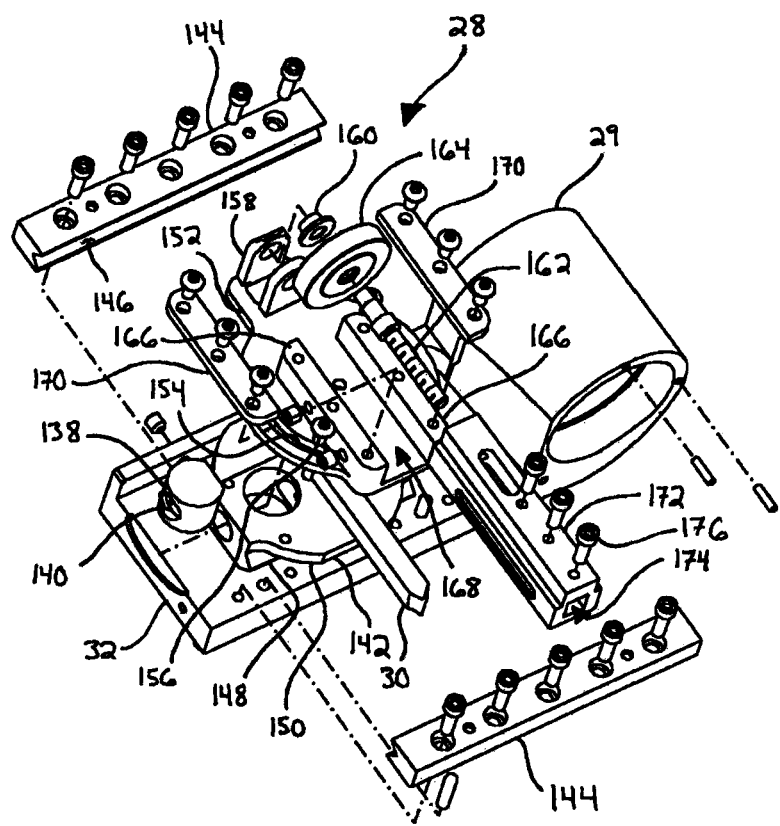
FIG. 10 is an exploded perspective view of a tool support assembly of the pipe flange facing apparatus.
Figure 11:
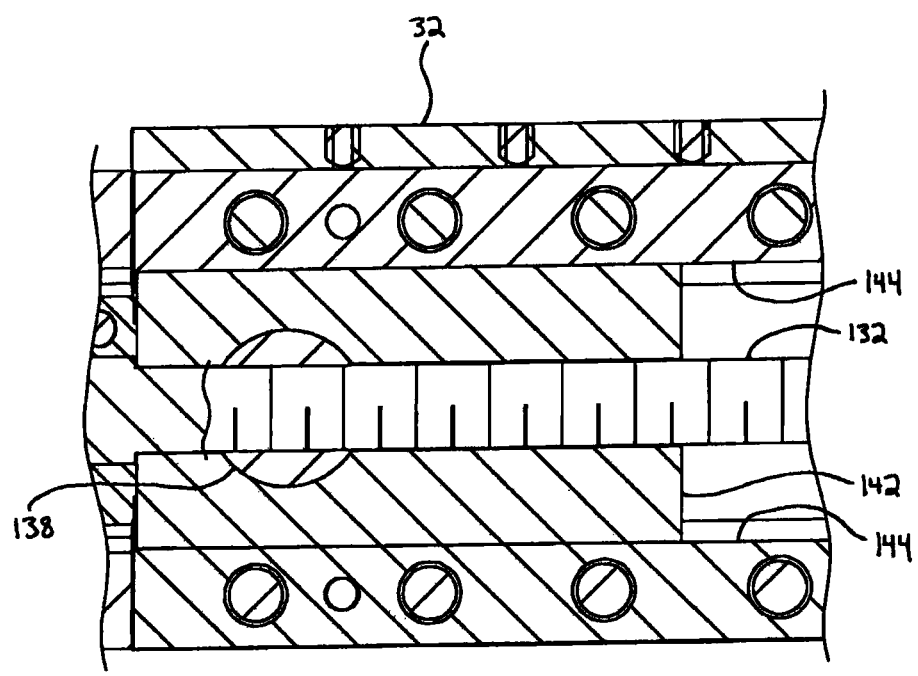
FIG. 11 is a sectional view along line 11-11 of FIG. 1 illustrating a feed nut and a slide bracket of the tool support assembly.
Figure 12:
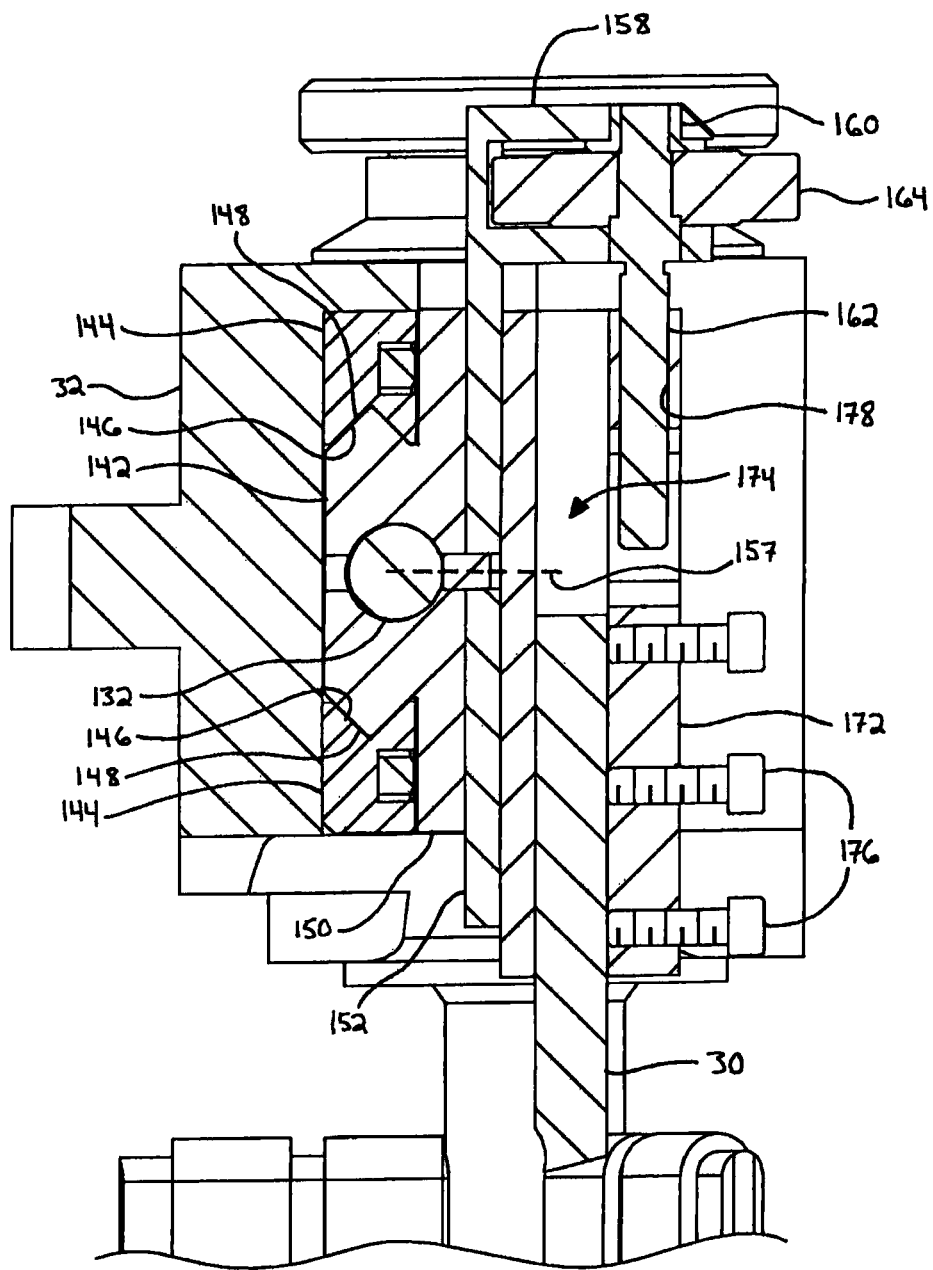
FIG. 12 is a sectional view along line 12-12 of FIG. 1 illustrating a depth adjustment screw and a tool holder of the tool support assembly.

Referring now to FIGS. 4-6, the anchor assembly 24 is generally supported by the anchor support 31 of the anchor-tool support bracket 29. The anchor assembly 24 includes a manual centering handle or knob 40 that may have a knurled outer surface or another type of surface that is easily gripped by an operator. Furthermore, the manual centering knob 40 may also have a square-shaped recess 41 such that the knob 40 can be turned by a ratchet wrench instead of applying torque by hand. The manual centering knob 40 supports a threaded shaft 42 that engages a centering shaft 44 having an internal threaded surface 46. A first end of the centering shaft 44 includes a square section 48 that prevents the centering shaft 44 from rotating relative to other components of the anchor assembly 24. As such, the centering shaft 44 and the threaded shaft 42 move further into engagement as the manual centering knob 40 is rotated in a first direction, and conversely, the centering shaft 44 and the threaded shaft 42 move toward disengagement as the manual centering knob 40 is rotated in a second direction. Such interaction between the threaded surfaces causes the centering shaft 44 to translate along a first axis 45 relative to other components of the anchor assembly 24. This axial motion helps secure the pipe flange facing apparatus 20 relative to the pipe 10 as described in further detail below.

A second end of the centering shaft 44 includes a frusto-conical surface 50 that tapers outwardly and away from the first end of the centering shaft 44. The function of the frusto-conical surface 50 is described in further detail below.

A support shaft 52 mounts the centering shaft 44 within an internal centering shaft passageway 54. As described briefly above, the support shaft 52 permits the centering shaft 44 to translate relative to the support shaft 52 in an axial direction. However, the centering shaft passageway 54 includes a square internal surface 56 that engages the square section 48 of the centering shaft 44 to prevent relative rotation between the shafts 44 and 52. As such, the square internal surface 56 and the square section 48 of the centering shaft 44 cause the centering shaft 44 to translate axially as the manual centering knob 40 rotates.

A first end of the support shaft 52 includes a recess 58 that accommodates a pair of thrust washers 60 disposed on opposite sides of a thrust bearing 62. The thrust washers 60 and bearing 62 prevent the support shaft 52 from contacting the manual centering knob 40 as the knob 40 rotates. The support shaft 52 also includes a flange 64 and a first bearing surface 66 proximate the first end that support a first bearing 68. The first bearing 68 may be a tapered bearing, such as a Timken L68110/L68149 bearing, although other bearings that rotatably support the support shaft 52 relative to the housing 22 may also be used. A second bearing surface 70 is spaced apart from the first end of the support shaft 52 and the first bearing surface 66. The second bearing surface 70 supports a second bearing 72 that may be identical to the first bearing 68, although the second bearing 72 is preferably oriented in mirrored relation relative to the first bearing 68.

A threaded surface 74 is disposed proximate the second bearing surface 70. The threaded surface 74 engages a lock nut 76 having an internal threaded surface 77. A lock washer 78 is sandwiched between the lock nut 76 and the second bearing 72 to reduce any "slop" or "play" between the support shaft 52 and the housing 22. A seal 80 is disposed on the opposite side of the lock nut 76 from the second bearing 72. The seal 80 is also disposed between the housing cap 35 and the support shaft 52 to prevent bearing lubrication from leaking out of the support shaft passageway 33.

A second end of the support shaft 52 includes a plurality of axially elongated centering slots 82 that extend between the centering shaft passageway 54 and the outside of the support shaft 52. Each centering slot 82 accommodates a base centering locator 84, and together the base centering locators 84 define a section of a spoke having, for example, three legs that engage the inner diameter wall 14 of the pipe 10. Each of the base centering locators 84 has a trapezoidal shape as viewed from the side. That is, the base centering locators 84 each include an inner surface 86 that has a slope matching the slope of the frusto-conical surface 50 of the centering shaft 44. As such, as the centering shaft 44 is translated axially upwardly (i.e., as the centering shaft 44 moves further into engagement with the threaded shaft 42 by rotating the manual centering knob 40 in the first direction) the frusto-conical surface 50 of the centering shaft 44 forces the base centering locators 84 to move radially outwardly. In operation, the base centering locators 84 move radially outwardly to engage the inner diameter wall 14 of the pipe 10 and thereby secure the anchor assembly 24 relative to the pipe 10. Furthermore, the axisymmetric shape of the frusto-conical surface 50 and the common slope of the base centering locators 84 ensure the locators 84 move outwardly at the same rate and thereby center the anchor assembly 24 relative to the pipe 10.

Each of the base centering locators 84 includes an outer surface 88 having small groove 90 to accommodate an elastic keeper 92 (e.g., an o-ring) that biases the base centering locators 84 radially inwardly (i.e., toward the frusto-conical surface 50 of the centering shaft 44). The grooves 90 prevent the base centering locators 84 from pinching the o-ring 92 against the inner diameter wall 14 of the pipe 10. In addition, each of the base centering locators 84 may be shaped to accommodate one or more stackable centering locator extensions 94. The extensions 94 are preferably provided in various lengths such that the effective diameter of the spoke can be increased to a size just less than the inner diameter 14 of the pipe 10 before turning the manual centering knob 40. As such, the pipe flange facing apparatus 20 may be easily used with various size pipes. The extensions 94 also preferably include an outer surface 96 having a small groove 98 to accommodate the o-ring 92.

Referring now to FIGS. 4 and 7-9, the feed assembly 26 is generally supported by the gearbox 34. The feed assembly 26 includes a manual drive handle or knob 100 that may have a star shape, a cushion grip, a combination of the two, or another type of surface that is easily gripped by an operator. The manual drive knob 100 connects to a drive shaft 102 such that drive shaft 102 rotates with the manual drive knob 100. The drive shaft 102 includes a first end that may have diametrically opposed flats 104 (FIG. 9) such that the shaft 102 can be turned by a wrench instead of applying torque to the manual drive knob 100 by hand. A section proximate the first end and the second end of the drive shaft 102 each engage a needle bearing 106 and a pair of thrust washers 108 disposed on opposite sides of a thrust bearing 110. The bearings 106 and 110 and the washers 108 rotatably support the drive shaft 102 about a second axis 111 defined by the gearbox 34. The drive shaft 102 supports a key 112 between the first and second ends. The key 112 engages a worm 114 such that the worm 114 rotates with the drive shaft 102 about the second axis 111. The worm 114 may be a Boston Gear H1618-12998 worm, although other appropriate worms may also be used. The drive shaft 102, bearings 106 and 110, washers 108, and worm 114 are secured within the gearbox 34 by the first gearbox cover 36.

The worm 114 drives a worm gear 116 that may be a Boston Gear worm gear, although other appropriate worm gears may also be used. The worm gear 116 engages a key 118 supported by a feed collar 120 such that the feed collar 120 rotates with the worm gear 116. The feed collar 120 includes a plate 122 for locating the worm gear 116. The feed collar 120 also has first and second ends that each engage a needle bearing 124 and a pair of thrust washers 126 disposed on opposite sides of a thrust bearing 128. The bearings 124 and 128 and the washers 126 rotatably support the feed collar 120 and the worm gear 116 about a third axis 129 defined by the gearbox 34. The feed collar 120 also has a hexagonal shaped internal surface 130 (FIG. 8) to engage and drive a feed screw 132 having a hexagonal shaped external surface 134 at a first end. The feed screw 132 may be a ½-11 screw, although the screw 132 may also be interchangeable with other feed screws having various pitches, such as ½-20 screws and the like, to provide facing operations having various degrees of fineness as described in further detail below. The feed screw 132 supports a threaded collar 136 that axially restrains the feed screw 132 and is disposed outside of the gearbox 34. The feed screw 132, feed collar 120, bearings 124 and 128, washers 126, and worm gear 116 are secured within gearbox 34 by the second gearbox cover 38.

Referring now to FIGS. 4 and 10-12, the tool support assembly 28 is generally supported by the gib support 32 of the anchor-tool support bracket 29. The tool support assembly 28 includes a feed nut 138 having an internal threaded surface 140 that engages the feed screw 132. The feed nut 138 is housed within a slide bracket 142 that slides along a linear path (i.e., along the third axis 129) defined by two elongated gibs 144 connected to the gib support 32. Specifically, the linear path is provided by an inverted v-shaped groove 146 provided on each of the gibs 144. The v-shaped grooves 146 engage one of two v-shaped surfaces 148 on the slide bracket 142, and as such, the slide bracket 142 and the feed nut 138 are displaced along the linear path as the feed screw 132 rotates. Of course, the feed nut 138 may be interchangeable with other feed nuts having pitches corresponding to those of the interchangeable feed screws as described above.

The slide bracket 142 also includes a platform 150 that pivotally supports a swivel bracket 152. The swivel bracket 152 includes one or more arcuate grooves 154 that each accommodate a fastener 156 normally connected to the slide bracket 142. The fasteners 156 may be loosened to permit the swivel bracket 152 to be reoriented relative to the slide bracket 142 and the housing 22. Specifically, the swivel bracket 152 may be reoriented about a fourth axis 157 (FIG. 12) perpendicular to each of the other axes 45, 111, and 129.

The swivel bracket 152 also includes a yoke 158 that supports a bushing 160 to pivotally mount a depth adjustment screw 162 and a manual depth adjustment handle or knob 164 as described in further detail below. The swivel bracket 152 further includes two keeper supports 166 that define a tool holder slot 168 there between. Each keeper support 166 also connects to a keeper bracket 170 that supports a tool holder 172 within the tool holder slot 168.

The tool holder 172 includes an internal passageway 174 to house the flange facing tool 30 and accommodates fasteners 176 to secure the facing tool 30 within the internal passageway 174. The tool holder 172 also includes an internal threaded section 178 (FIG. 12) in engagement with the depth adjustment screw 162. As such, the manual depth adjustment knob 164 may be turned to displace the tool holder 172 within the tool holder slot 168 and thereby vary the depth of cut provided by the facing tool 30. Furthermore, the manual depth adjustment knob 164 may include markings 180 (FIG. 1) to indicate the variation in the depth of cut provided by the facing tool 30 for turning the knob 164 a given angle.

Figure 13:
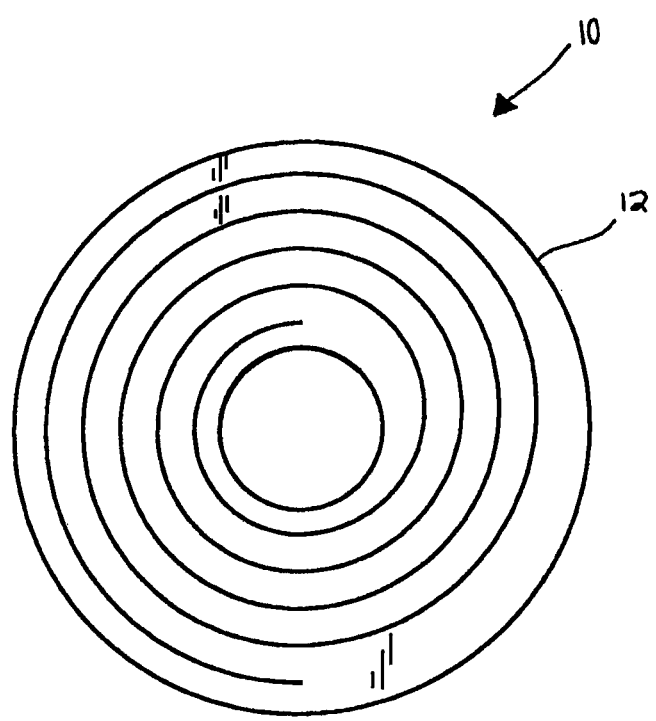
FIG. 13 is a top view of a spiral cutting path formed by the pipe flange facing apparatus of FIG. 1; the rate of radial displacement of the path is exaggerated for clarity.

The pipe flange facing apparatus 20 is preferably used as follows. First, a feed screw 132 and corresponding feed nut 138 that provide the desired degree of fineness for the facing operation are selected and installed. Next, optionally and depending on the size of the pipe 10, the o-ring 92 is removed from the base centering locators 84 and an appropriate number of centering locator extensions 94 are connected to the anchor assembly 24. The appropriate number of centering locator extensions 94 preferably defines a spoke having an effective diameter just less than the inner diameter 14 of the pipe 10. The o-ring 92 is then repositioned about the outermost centering locator extensions 94. Next, optionally, the fasteners 156 are loosened such that the swivel bracket 152 may be reoriented to adjust the angle of the facing tool 30 relative to the pipe flange 12. The fasteners 156 are then retightened. Next, optionally, the manual depth adjustment knob 164 is rotated to provide the desired depth of cut. The apparatus 20 is then positioned such that the centering locators 84, and optionally 94, are disposed within the pipe 10 proximate the flange 12. Next, the manual centering knob 40 is rotated, preferably no more than a few rotations, to engage the outer-most centering locators 84 or 94 against the inner diameter wall 14 of the pipe 10 and thereby secure the anchor assembly 24 relative to the pipe 10. The manual drive knob 100 is then grasped and pushed such that the housing 22 rotates in a clockwise direction about the first axis 45 and the anchor assembly 24. The orientation of the manual drive knob 100 relative to the pipe 10 preferably does not change as the housing 22 rotates. As such, the manual drive knob 100 rotates relative to the second axis 111 and the housing 22 in a counter-clockwise direction. This relative rotation causes the drive shaft 102 and the feed screw 132 to linearly move the slide bracket 142 and the flange facing tool 30 relative to the housing 22. Furthermore, the linear motion of the facing tool 30 relative to the housing 22 and the rotation of the housing 22 about the anchor assembly 24 causes the facing tool 30 to cut a spiral path like the path shown in FIG. 13 into the pipe flange 12. It should be noted, however, that the rate of radial displacement of the spiral path shown in FIG. 13 is exaggerated for clarity.

The pipe flange facing apparatus of the present invention is advantageously easy to transport; the apparatus preferably weighs at most 20 lbs. However, the apparatus is also preferably capable of resurfacing damaged raised-face or lens-ring joint flanges from 1 to 4 inches in size. Furthermore, the pipe flange facing apparatus is manually-driven and does not need access to a power source such as an air compressor or a portable generator. As such, the apparatus may be used in remote locations or locations in which a large power source would be difficult to accommodate. Further still, the anchor assembly is deployed using a simple turning motion and a facing operation is conducted by simply pushing the drive knob about the anchor assembly.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. An apparatus for facing a flange of a pipe, comprising:
    a housing;
    an anchor assembly rotatably supported by the housing, the anchor assembly being configured to engage an inner surface of the pipe;
    a tool holder translatably supported by the housing, the tool holder being configured to support a facing tool for facing the flange of the pipe;
    a drive shaft being rotatable relative to the housing to translate the tool holder relative to the housing; and
    wherein the housing is rotatable relative to the anchor assembly about a first axis in a first direction and the drive shaft is simultaneously rotatable relative to the housing about a second axis generally parallel to the first axis in a second direction opposite the first direction to move the tool holder along a spiral path and thereby face the flange of the pipe.

2. The apparatus of claim 1, further comprising a slide bracket translatably supported by the housing, the tool holder being supported by the slide bracket.

3. The apparatus of claim 2, further comprising a swivel bracket pivotally supported by the slide bracket, the swivel bracket including at least a first keeper bracket, the tool holder being translatably supported by the first keeper bracket.

4. The apparatus of claim 3, further comprising:
    a depth adjustment screw rotatably supported by the swivel bracket, the depth adjustment screw rotating relative to the swivel bracket to thereby translate the tool holder relative to the first keeper bracket; and
    a depth adjustment handle connected to the depth adjustment screw so as to rotate with the depth adjustment screw.

5. The apparatus of claim 1, further comprising a feed shaft being rotatable relative to the housing about a third axis to translate the tool holder relative to the housing along the third axis, the feed shaft being driven by the drive shaft, and the third axis being generally perpendicular to the second axis.

6. The apparatus of claim 5, further comprising a slide bracket translatably supported by the housing, the tool holder being supported by the slide bracket.

7. The apparatus of claim 5, further comprising:
    a worm supported by the drive shaft so as to rotate with the drive shaft; and
    a worm gear supported by the feed shaft so as to rotate with the feed shaft, the worm gear being driven by the worm.

8. The apparatus of claim 1, wherein the housing defines a shaft passageway and includes a gib support, the anchor assembly includes:
    a plurality of centering locators each including a tapered surface;
    a centering shaft supported within the shaft passageway and including a tapered surface, the centering shaft being translatable along the first axis relative to the housing such that the tapered surface of the centering shaft engages the tapered surfaces of the centering locators and thereby displaces the centering locators in a radial direction to engage an internal surface of the pipe;
    and further comprising:
    a slide bracket translatably supported by the gib support, the tool holder being supported by the slide bracket; and
    a feed screw being rotatable relative to the housing to translate the slide bracket relative to the housing, the feed screw being driven by the drive shaft.

9. The apparatus of claim 8, further comprising:
    at least a first gib supported by the gib support, the slide bracket being translatably supported by the first gib;
    a swivel bracket pivotally supported by the slide bracket; and
    at least a first keeper bracket supported by the swivel bracket, the tool holder being translatably supported by the first keeper bracket.

10. The apparatus of claim 1, further comprising a drive handle connected to the drive shaft so as to rotate with the drive shaft, and wherein the apparatus is configured such that a drive force applied to the drive handle rotates the housing about the first axis in the first direction and simultaneously rotates the drive shaft relative to the housing about the second axis in the second direction to move the tool holder along the spiral path.

11. An apparatus for facing a flange of a pipe, comprising:
    a housing;
    an anchor assembly rotatably supported by the housing, the anchor assembly being configured to engage an inner surface of the pipe;
    a tool holder translatably supported by the housing, the tool holder being configured to support a facing tool for facing the flange of the pipe;
    a drive shaft rotatable relative to the housing to translate the tool holder relative to the housing;
    a manual drive handle connected to and operable to rotate the drive shaft, a drive force applied by a user to the drive handle simultaneously rotating the housing relative to the anchor assembly and the drive shaft relative to the housing to move the tool holder along a spiral path and thereby face the flange of the pipe;
    a slide bracket translatably supported by the housing, the tool holder being supported by the slide bracket; and
    a swivel bracket pivotally supported by the slide bracket, the swivel bracket including at least a first keeper bracket, the tool holder being translatably supported by the first keeper bracket.

12. The apparatus of claim 11, further comprising:
    a depth adjustment screw rotatably supported by the swivel bracket, the depth adjustment screw rotating relative to the swivel bracket to thereby translate the tool holder relative to the first keeper bracket; and
    a depth adjustment handle connected to the depth adjustment screw so as to rotate with the depth adjustment screw.

13. The apparatus of claim 11, wherein the housing is rotatable relative to the anchor assembly about a first axis in a first direction and the drive shaft is rotatable relative to the housing about a second axis in a second direction opposite the first direction to move the tool holder along a spiral path and thereby face the flange of the pipe.

14. The apparatus of claim 13, wherein the first axis and the second axis are generally parallel.

15. The apparatus of claim 13, further comprising a feed shaft rotatable relative to the housing about a third axis to translate the tool holder relative to the housing along the third axis, the feed shaft being driven by the drive shaft, and the third axis being generally perpendicular to the second axis.

16. The apparatus of claim 15, further comprising:
- a worm supported by the drive shaft so as to rotate with the drive shaft; and
- a worm gear supported by the feed shaft so as to rotate with the feed shaft, the worm gear being driven by the worm.

17. The apparatus of claim 13, wherein the housing defines a shaft passageway and includes a gib support, the anchor assembly includes:
- a plurality of centering locators each including a tapered surface;
- a centering shaft supported within the shaft passageway and including a tapered surface, the centering shaft being translatable along the first axis relative to the housing such that the tapered surface of the centering shaft engages the tapered surfaces of the centering locators and thereby displaces the centering locators in a radial direction to engage an internal surface of the pipe; and
- a feed screw being rotatable relative to the housing to translate the slide bracket relative to the housing, the feed screw being driven by the drive shaft,
- wherein the slide bracket is translatably supported by the gib support.

18. The apparatus of claim 17, further comprising:
- at least a first gib supported by the gib support, the slide bracket being translatably supported by the first gib.

\* \* \* \* \*